United States Patent
Oota et al.

(10) Patent No.: US 7,951,029 B2
(45) Date of Patent: May 31, 2011

(54) GUIDE FOR TRANSMISSION DEVICE

(75) Inventors: Haruhisa Oota, Osaka (JP); Junya Kurohata, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 477 days.

(21) Appl. No.: 12/188,427

(22) Filed: Aug. 8, 2008

(65) Prior Publication Data

US 2009/0105023 A1    Apr. 23, 2009

(30) Foreign Application Priority Data

Oct. 22, 2007    (JP) .................................. 2007-274327

(51) Int. Cl.
*F16H 7/08*    (2006.01)
(52) U.S. Cl. ........................................ 474/111; 474/140
(58) Field of Classification Search .................. 474/101, 474/109, 110, 111, 140, 145, 146, 147
See application file for complete search history.

(56) References Cited

U.S. PATENT DOCUMENTS

| | | | |
|---|---|---|---|
| 5,184,983 A | 2/1993 | Shimaya et al. | |
| 5,820,502 A | 10/1998 | Schulze | |
| 5,989,138 A * | 11/1999 | Capucci | 474/109 |
| 2003/0134704 A1 * | 7/2003 | Konno et al. | 474/111 |
| 2006/0205548 A1 | 9/2006 | Konno | |

FOREIGN PATENT DOCUMENTS

| | | |
|---|---|---|
| EP | 1441149 A1 | 7/2004 |
| JP | 2519476 | 9/1996 |
| JP | 2001-311457 A | 11/2001 |
| JP | 2006250208 A | 9/2006 |

\* cited by examiner

*Primary Examiner* — Emmanuel M Marcelo
(74) *Attorney, Agent, or Firm* — Howson & Howson LLP

(57) ABSTRACT

In an engine timing chain guide composed of a synthetic resin shoe supported on a frame by L-shaped and strip-shaped engagement members integrally molded as unitary parts of the shoe, the L-shaped members are formed with oblique tongues that resiliently engage side edges of the frame member, and the strip-shaped engagement members include surfaces that extend obliquely toward, and resiliently engage, a side edge of the frame member. Laterally extending legs of the L-shaped members are also formed with bulged portions, and the frame member is sandwiched between the bulged portions and a back side of the shoe.

2 Claims, 11 Drawing Sheets

GUIDE FOR TRANSMISSION DEVICE

CROSS-REFERENCE TO RELATED APPLICATION

This application claims priority on the basis of Japanese patent application 2007-274327, filed Oct. 22, 2007. The disclosure of Japanese application 2007-274327 is hereby incorporated by reference.

FIELD OF THE INVENTION

This invention relates to a guide for a transmission device used as a fixed guide or a movable guide, which guides and tensions a transmission chain in an automobile engine or the like.

BACKGROUND OF THE INVENTION

As shown in FIGS. 8 and 9, a known guide, in the form of a tensioner lever 500, is composed of a synthetic resin shoe 510 having integrally molded, L-shaped engagement pieces 511, which engage one side of a shoe-supporting base 520, and a plurality of strip-shaped engagement pieces 512, which engage the opposite side of the base, to prevent the floating of the shoe 510 relative to the base 520. The guide is used to guide, and maintain proper tension in, a transmission chain. Such a guide is described in U.S. Pat. No. 5,184,983, granted Feb. 9, 1993.

Another known guide is shown in FIGS. 10 and 11. In this guide 600, a plurality of L-shaped engagement pieces 613, and a plurality of strip-shaped pieces 614, are integrally molded as parts of a synthetic resin shoe. The engagement pieces are disposed in a zigzag arrangement along the length of the shoe, with three L-shaped pieces situated on one side of the shoe, and two strip-shaped pieces and one L-shaped piece on the other side of the shoe, the last-mentioned L-shaped piece being adjacent one end of the shoe. Such a guide is described in United States Patent Publication 2006/0205548, published Sep. 14, 2006.

The guide 500 in FIGS. 8 and 9 has a simple engagement structure in which one side of the shoe has only strip-shaped engagement pieces. Consequently, the shoe is liable to become disengaged from the supporting base while in operation. A clearance is provided between the synthetic resin shoe and the arm to allow for expansion and contraction of the resin. Expansion and contraction is repeated due to a changes in temperature in the engine in which the guide is used, and can result in longitudinal movement of the shoe sufficient to cause the shoe to disengage the supporting base.

In the guide shown in FIGS. 10 and 11, the dimensional tolerances are strictly set in order to avoid clearances between the base frame and the L-shaped and strip-shaped engagement pieces in the assembled guide. However, in order to maintain these strict tolerances, manufacture of the guide requires troublesome high precision molding of the shoe. Moreover, if strict dimensional tolerances are not maintained in the manufacture of the shoe, a widthwise shift of the shoe relative to the base frame can occur when the shoe is in sliding contact with a traveling transmission chain, generating biased wear, which sometimes results in premature breakage of the shoe.

This invention provides a guide which avoids the above-described problems. The invention also facilitates guide production, and increases the useful life of metal molds used to manufacture the guide, by relaxation of dimensional tolerances. Clearance between the synthetic resin shoe and the base frame is removed, so that, during the use of the guide biased wear of the synthetic resin shoe due to shifts in its mounting position are avoided, the formation of traveling lines is suppressed, and vibration noise due to backlash is also prevented.

SUMMARY OF THE INVENTION

The invention can be embodied in a fixed guide or in a movable guide, and can be used with any of various endless, flexible, traveling power transmission media, including valve timing chains for internal combustion engines as well as chains and transmission media in other kinds of machinery.

The guide comprises a shoe and a base frame. The shoe is an elongated shoe having a front surface, facing in a first direction, for sliding contact with an endless, flexible, transmission medium traveling along the direction of elongation of the shoe, and a back surface facing in a second direction opposite to the first direction. The shoe has first and second opposite ends spaced from each other along the direction of elongation of the shoe, and opposite side edges extending in the direction of elongation of the shoe. The base frame is an elongated base frame mountable on a mounting surface. The base frame has first and second elongated sides, and extends along the back surface of the shoe and supports the shoe.

A plurality of L-shaped engagement portions and strip shaped engagement portions are integrally molded as a unit with the shoe, and protrude from the back surface of the shoe, along the shoe's side edges, in an alternating arrangement in which, proceeding from one end of the shoe to the other, each successive engagement portion is farther from said one end, and protrudes from a different side edge than, an immediately preceding engagement portion. Thus, the engagement portions alternately embrace the first and second elongated sides of said base frame.

Each L-shaped engagement portion comprises a first leg extending in said second direction past a side of the base frame, a second leg extending laterally in a direction such that a part of the base frame is located between the second leg and the back surface of the shoe, and a positioning tongue extending obliquely, from within a cut-out in the first leg, toward, and resiliently pressing against, an adjacent side of the base frame. Each strip-shaped engagement portion includes a frame positioning limiting surface, extending obliquely from the back surface of the shoe toward, and resiliently pressing against, an adjacent side surface of the base frame.

The structure by which the shoe is attached to the base frame prevents floating of the shoe relative to the base frame, and allows the shoe to be attached easily to the base frame in the process of assembly of the guide.

Additionally, because the oblique tongues and the frame positioning surfaces of the strip portions embrace, and press resiliently against, the sides of the base frame, even if a clearance is provided between the sides of the base frame and the engagement portions in order to facilitate assembly, the elasticity of the resin from which the shoe and the engagement portions are formed ensures that the shoe is firmly attached to the base frame while allowing relaxation of dimensional tolerances in the widths of the base frame and the shoe. The relaxation of tolerances results in improved production, increased useful life of the metal mold used to form the shoe, and avoidance of vibration and noise due to backlash in direction of the width of the guide. Additionally uneven wear and formation of traveling lines in the shoe due to shifts in its mounting position can be suppressed.

Even if the widthwise clearance between the shoe and the base frame increases as a result of thermal expansion under high temperature conditions encountered in the operation of an engine, the frame positioning limiting surfaces of the strip portions and the tongues of the L-shaped engagement portions, which are slanted obliquely toward the sides of the base frame, take up the clearance due to the elasticity of the synthetic resin from which they are formed. Moreover, where the guide is a movable guide, urged by the plunger of a tensioner against a traveling transmission chain or the like, shifts in the position of abutment between the plunger and the guide, due to lateral shifts in the position of the chain, can be avoided so that a pressing force can be more reliably exerted against the guide by the plunger.

In a preferred embodiment, a bulged portion is formed on the second leg of each L-shaped engagement portion, each bulged portion protruding toward the back surface of the shoe, and engaging the base frame so that the base frame is sandwiched between the bulged portion and the back surface of the shoe. With this structure, even if a clearance is provided between the base frame and the back surface of the shoe for the purpose of facilitating assembly of the guide, the base frame is sandwiched between the bulged portions and the back surface of the shoe by pressure due to the elasticity of the synthetic resin. Here also, dimensional tolerances of the base frame and the synthetic resin shoe can be relaxed, production is facilitated, and the useful life of the metal mold used to form the shoe can be increased. In addition, even if the clearance between the back of the shoe and the front surface of the base frame increases due to thermal expansion under the high temperature conditions encountered in the operation of an engine, vibration noise due to backlash between the shoe and the base frame in the direction perpendicular to the front and back surfaces of the shoe in the shoe can be prevented.

DETAILED DESCRIPTION OF THE PREFERRED EMBODIMENTS

Here, the guide according to the invention will be described with reference to an embodiment in which the guide is used as a guide for a timing chain in an automobile engine, which transmits power from a driving sprocket on an engine crankshaft to one or more driven sprockets on valve-operating camshafts. The invention is applicable both to a fixed guide on which the chain slides, and to a movable guide, which is used both to guide, and to maintain tension in, the timing chain.

The principal components of the guide are a shoe and a base frame for supporting the shoe. The shoe is preferably composed of a synthetic resin on which a traveling transmission chain can slide smoothly. Examples of preferred resins are polyamide 6, polyamide 46, polyamide 66, and polyacetal resins. The base frame, is preferably composed of a metal such as aluminum or a synthetic resin material such as glass fiber-reinforced polyamide resin, as these materials exhibit good durability in the high -temperature environment of an engine, and are able to withstand the forces resulting from changes in tension in a transmission chain.

Figure 1:
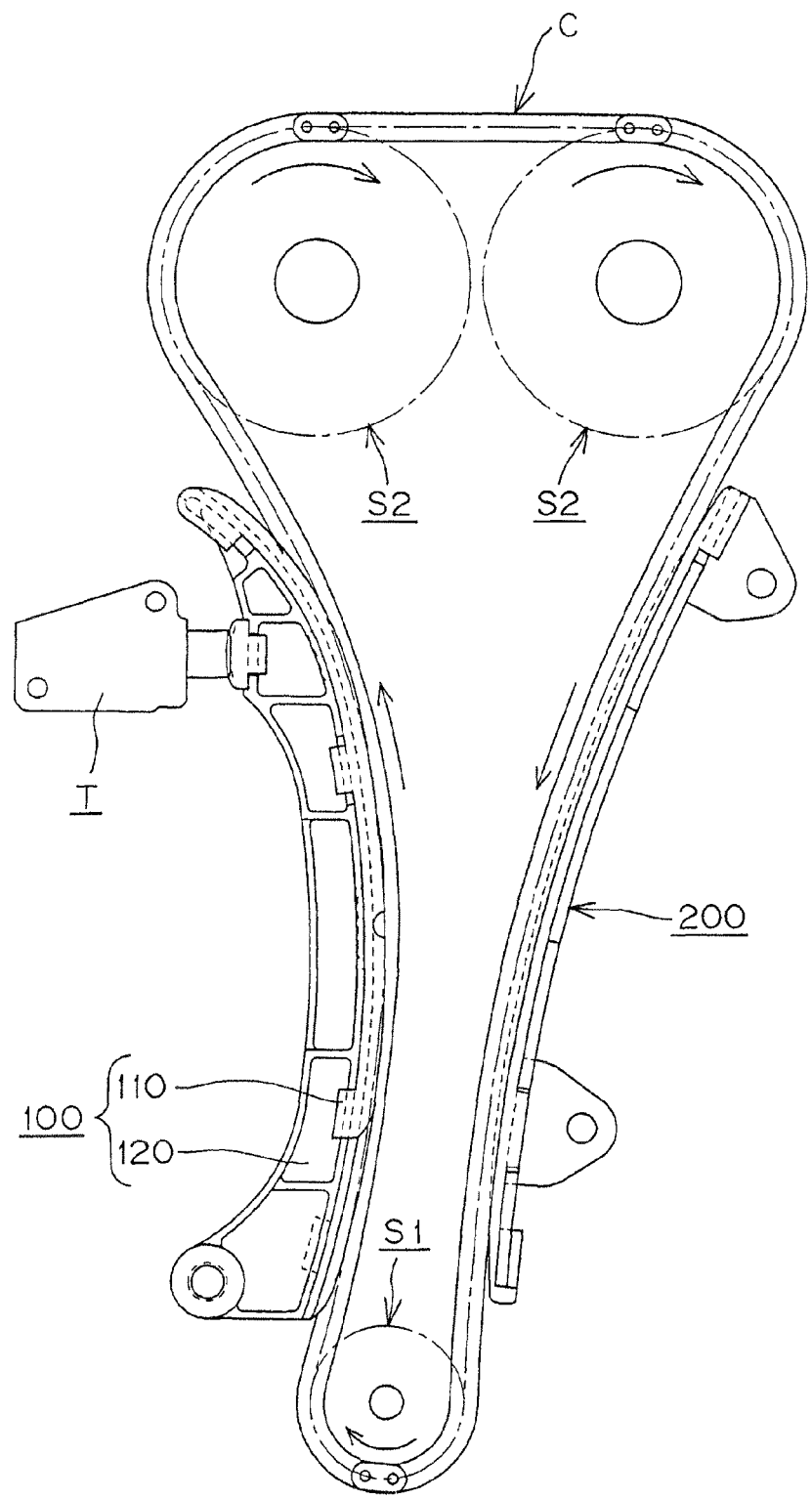
FIG. 1 is an elevational view of an engine timing transmission incorporating a guide in accordance with the invention.

As shown in FIG. 1, a movable guide 100 is incorporated in the valve timing transmission of an automobile engine, which transmits power through an endless, traveling chain C, driven by a crankshaft sprocket S1 and, engaged with driven camshaft sprockets S2. The movable guide 100 is in sliding contact with a part of the chain that travels from the driving sprocket S1 to one of the camshaft sprockets S2, and maintains tension in the transmission chain C.

The timing transmission of FIG. 1 also includes a fixed guide 200, which is in sliding contact with a part of the chain that returns from the other camshaft sprocket S2 to the crankshaft sprocket S1.

Figure 2:
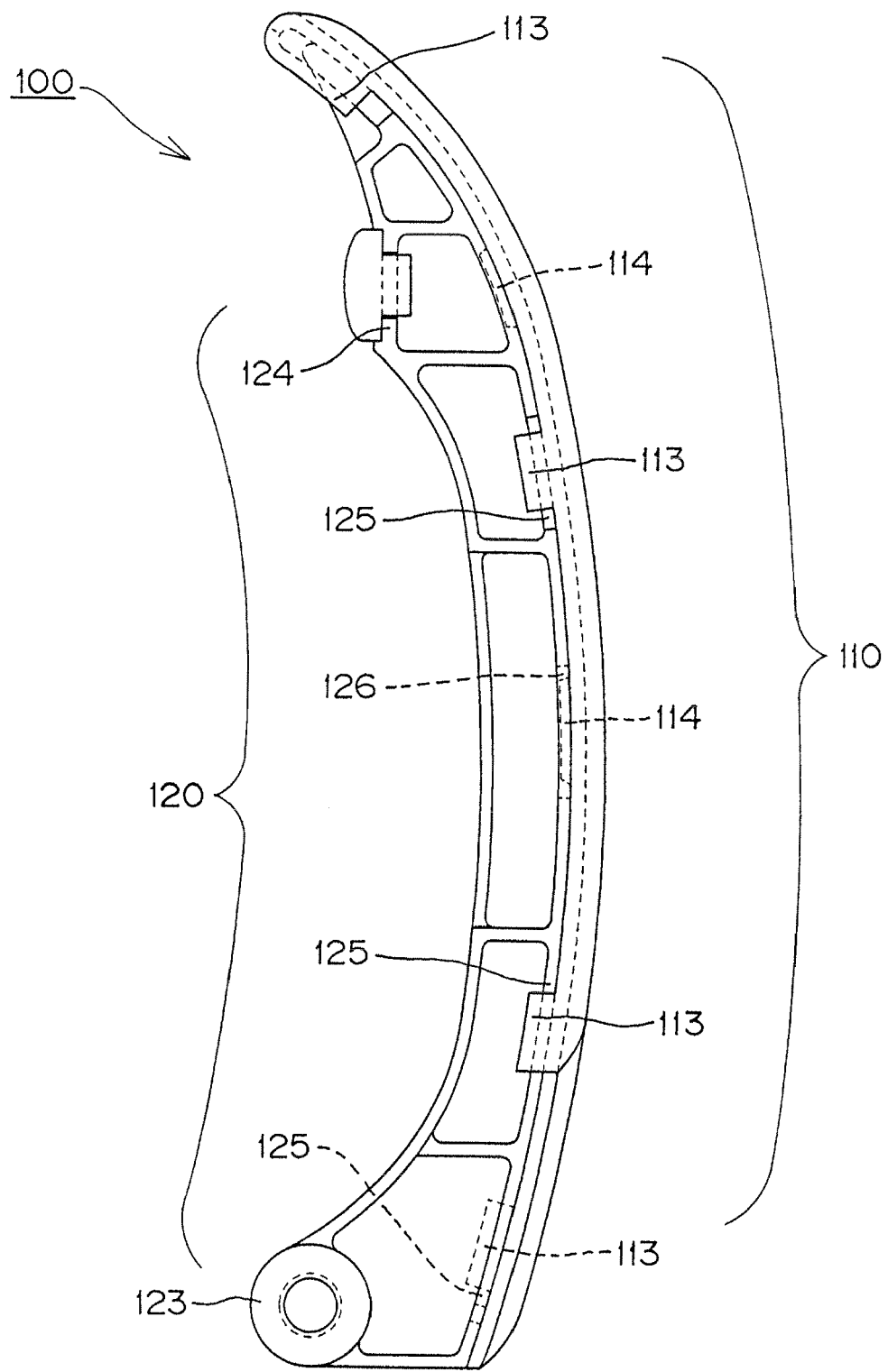
FIG. 2 is an elevational view of the guide.

As shown in FIG. 2, the movable guide 100 is an elongated guide comprising an elongated synthetic resin shoe 110 on which the transmission chain slides, and a base frame 120, which extends along the longitudinal direction of the shoe and supports the shoe. The guide is adapted for pivotal mounting on an engine block (not shown) by a boss 123 having a mounting hole for receiving a mounting shaft (not shown) fixed to the engine block. A pad 124 is engaged by the plunger of a tensioner T (FIG. 1), which urges the pivoted guide against the chain in order to apply appropriate tension to the chain and thereby prevent chain transmission failure due to excessive tensioning or loosening of the chain.

Figure 3:
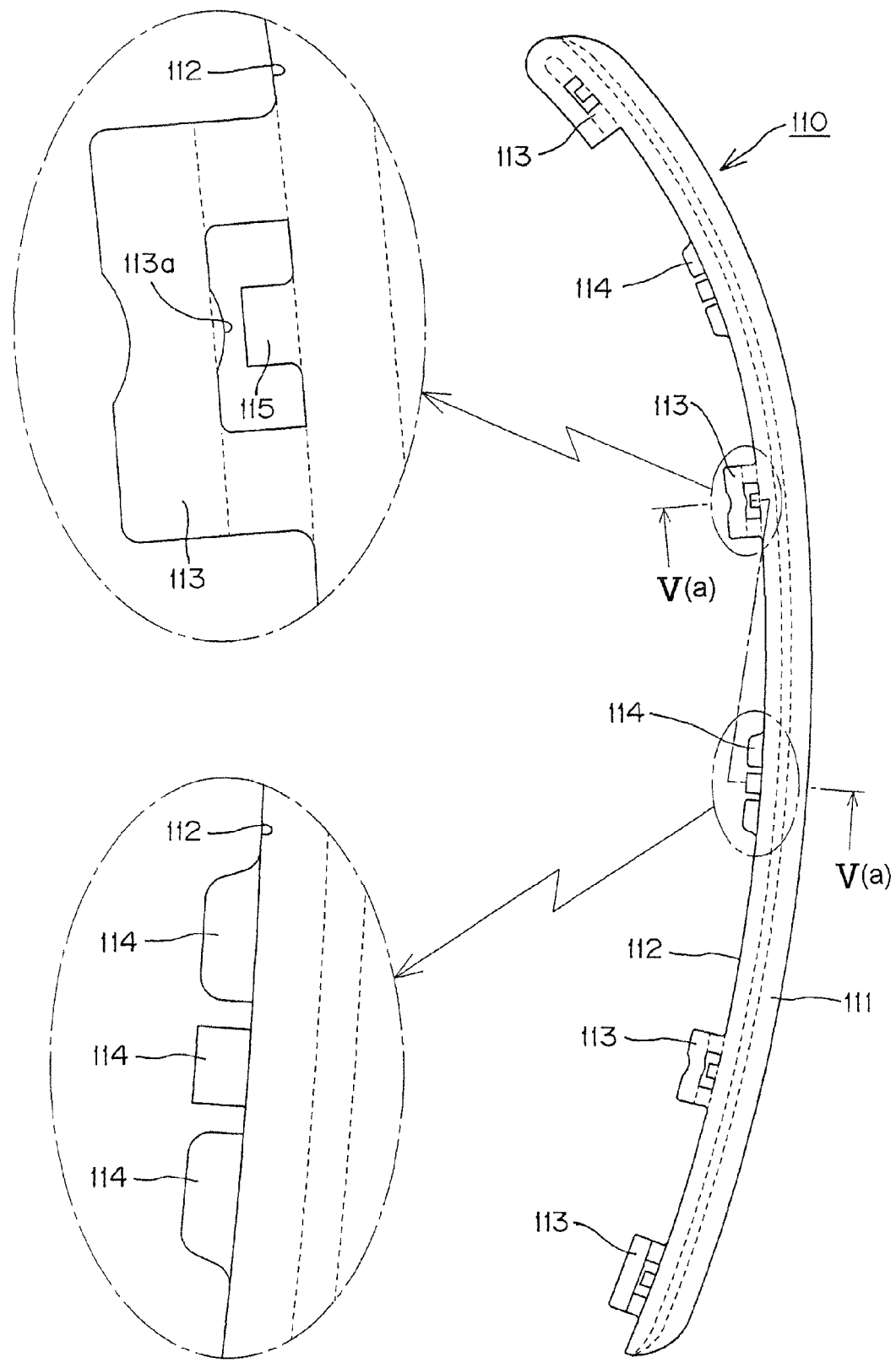
FIG. 3 is an elevational view of a synthetic resin shoe used in the guide, including enlarged auxiliary views.
Figure 4:
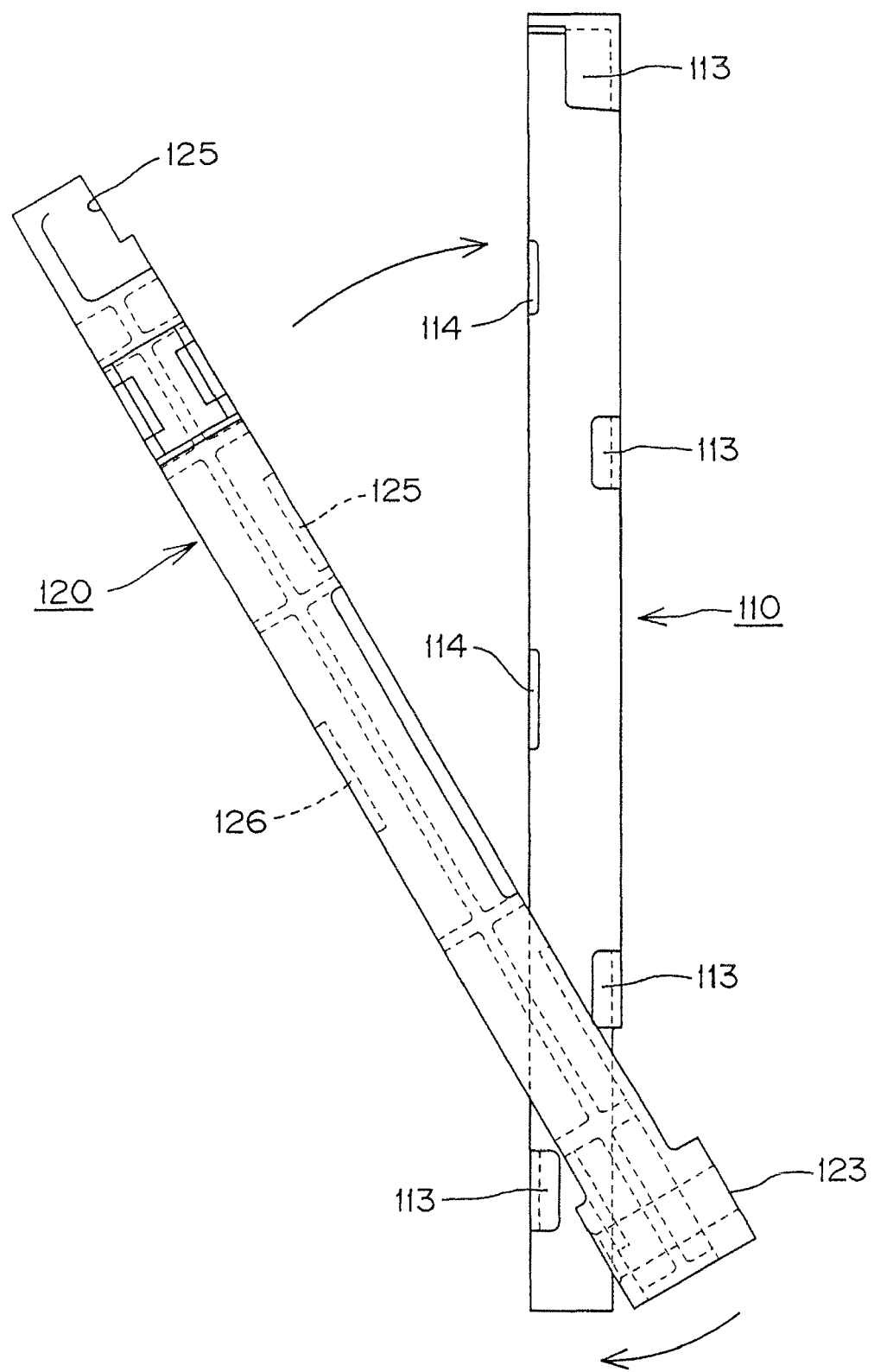
FIG. 4 is a schematic view illustrating the manner in which the guide is assembled.

As shown in FIGS. 2 to 4, L-shaped engagement portions 113 and protruding strip-shaped engagement portions 114, are integrally molded as a unit with the shoe 110, and protrude from the back surface 112 of the shoe along the side edges of the shoe. Each L-shaped engagement portion has two distinct legs, one extending substantially perpendicularly from the rear side of the main body of -the shoe and the other extending inward in a direction substantially parallel to the shoe. Each strip-shaped engagement portion, on the other hand, does not have an "L" shape, and extends rearward from the back of the shoe. The strip-shaped engagement portion can be composed of a single element, protruding obliquely from the rear of the shoe inward toward the base frame. The strip-shaped engagement portion can also include one or more parts that protrude perpendicularly from the back of the shoe. These engagement portions, 113 and 114, embrace the sides of the base frame in an alternating arrangement in which, proceeding from one end of the shoe to the other, each successive engagement portion is farther from said one end, and protrudes from a different side edge than, an immediately preceding engagement portion. In the embodiment illustrated in FIGS. 2 to 4, an L-shaped engagement portion 113 protrudes from a first side edge of the shoe at a location adjacent the end of the shoe which is approached by the chain as it travels from the crankshaft sprocket toward the guide. The three remaining L-shaped engagement portions 113 protrude from the opposite side edge of the shoe at three positions spaced along the longitudinal direction of the shoe. Two strip-shaped engagement portions 114 protrude from the first side edge respectively at locations between the locations of the second and third L-shaped portions and between the third and fourth L-shaped portions. Thus, the engagement portions are disposed in a zigzag arrangement along the length of the shoe.

Figure 5A:
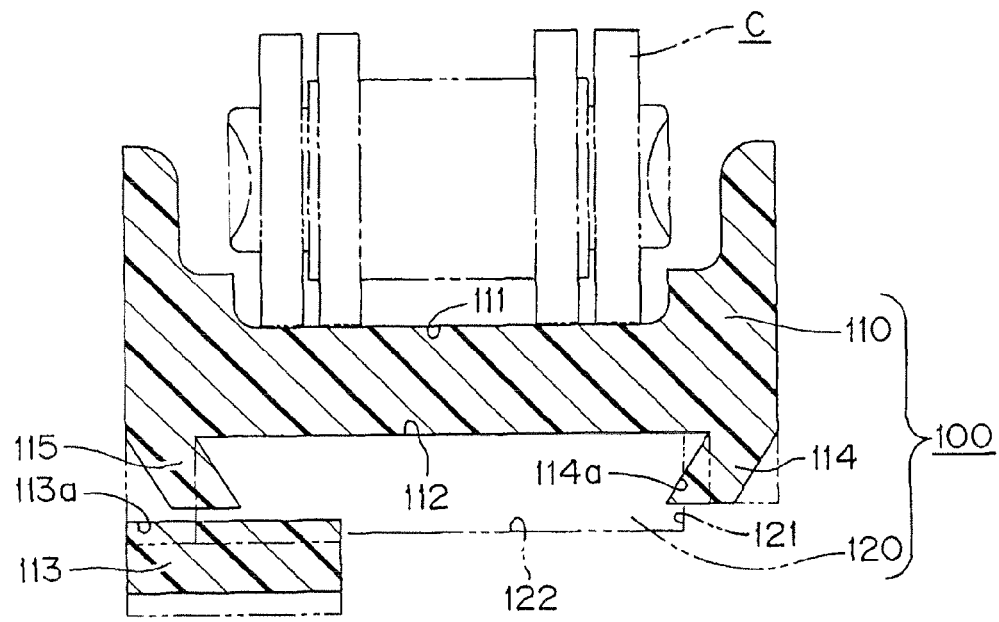
FIG. 5(a) is a cross-sectional view of the shoe, taken on surface V(a)-V(a) in FIG. 3, showing the shoe of the guide before it is mounted on a base frame.
Figure 6A:
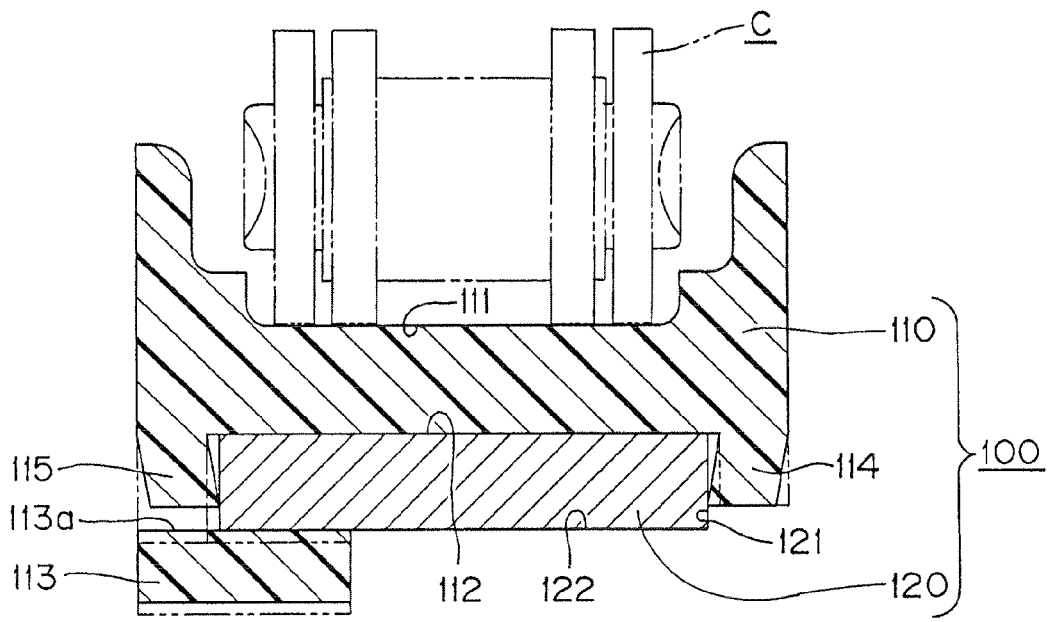
FIG. 6(a) is a cross-sectional view showing the guide according to the invention after the shoe is mounted on a base frame.

As shown in FIG. 3, the L-shaped engagement portion 113 includes a frame positioning tongue 115 extending from an edge of the main body of the shoe into a cut-out in a first leg of the L-shaped element that extends rearward from the edge of the main body of the shoe. As illustrated in FIGS. 5(a) and 6(a), the tongue 115 extends obliquely toward a side surface of a portion of the base frame 122 having a rectangular cross-section. The tongue resiliently presses against the side of the base frame. At the same time, a bulged portion 113a, seen in one of the enlarged auxiliary views in FIG. 3 and in FIGS. 5(a) and 6(a) presses resiliently against a bottom surface 122 of the base frame 120, sandwiching the base frame between the bulged portion and the back surface 112 of the shoe.

As seen in the other enlarged auxiliary view in FIG. 2, and in FIGS. 5(a) and 6(a), each strip-shaped engagement portion 114 has a frame positioning limiting surface 114a extending obliquely toward an opposite side surface 121 of the base frame 120. Surface 114a presses resiliently against the side of the base frame. Thus, the base frame is embraced by three tongues 115 resiliently engaged with one side surface and by another tongue 115 and two surfaces 114a resiliently engaged with the opposite side surface.

As shown in FIGS. 2 and 4, notches 125 are provided in the side edges of the base frame to receive the first legs of the L-shaped engagement portions 113 of the shoe. Similar notches 126 are provided to receive protruding strip-shaped engagement portions 114 of the shoe.

The process of assembly and disassembly of the guide 100 is illustrated in FIG. 4. In the assembly of the guide, the L-shaped engagement portion 113 adjacent the end of the shoe which is approached by the chain as the chain travels from the driving sprocket toward the guide, is fitted to a notch 125 in the base frame 120. Then, while the next L-shaped engagement portion 113, which is on the opposite edge of the shoe, is engaged with a notch 125 of the base frame, an L-shaped engagement portion 113 adjacent the opposite end of the shoe is fitted to a notch 125. The engagement of the L-shaped portions 113 with notches 125 is accomplished by rotating the base frame in the direction of the arrows in FIG. 4. As the base frame is rotated relative to the shoe, the two a strip-shaped engagement portions 114, which are situated at intermediate locations along the length of the of the shoe, slide across the face of the base frame until they reach notches 126. By continuing to rotate the base frame relative to the shoe, the tongues of the L-shaped engagement members can be deflected, allowing the notches 126 to clear the strip-shaped engagement portions, whereupon the strip shaped engagement portions can drop into notches 126 and engage the side 121 of the base frame 122 as shown in FIG. 6(a). When the force acting to rotate the base frame relative to the shoe is released, the resilient forces acting on both sides of the base frame become equal, and the base frame is securely embraced by the tongues 115 and the strip-shaped engagement members 114. At the same time, the base frame is resiliently sandwiched between the shoe and the bulging portions 113a of the L-shaped engagement portions 113.

When the synthetic resin shoe 110 and the base frame 120 are to be disengaged from each other, the strip-shaped engagement portions are removed from notches 126 by twisting the shoe. This allows the base frame to be rotated in the direction opposite to the direction indicated by the arrows in FIG. 4, whereby the L-shaped engagement portions 113 are removed from notches 125.

Figure 5B:
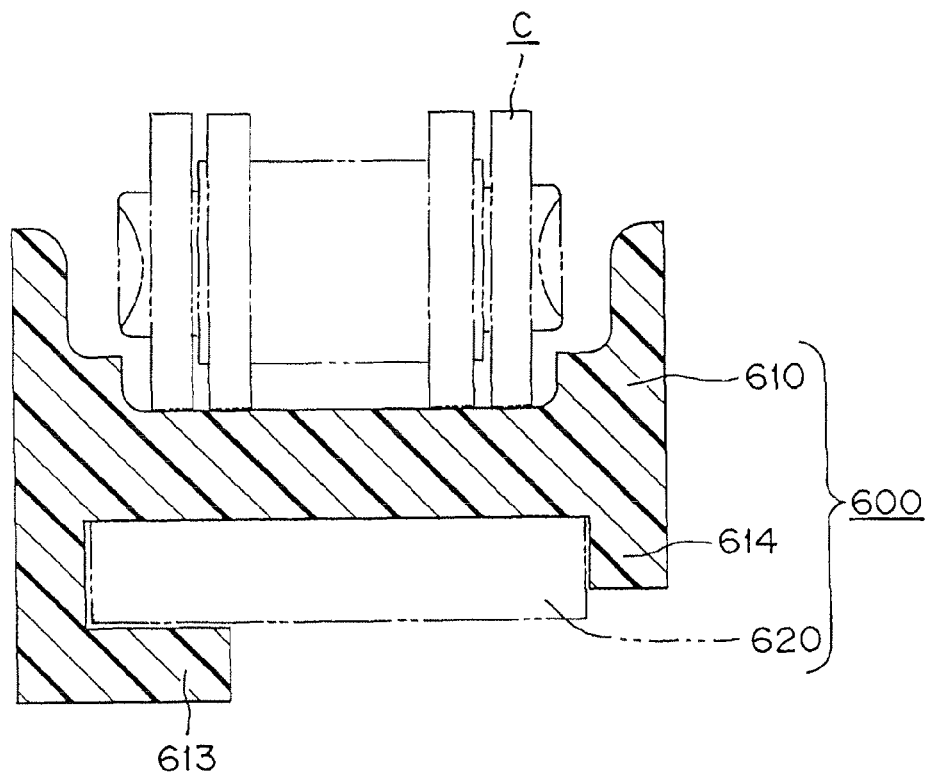
FIG. 5(b) is a cross-sectional view of a prior art shoe taken on plane V(b)-V(b) in FIG. 10, showing the shoe before it is mounted on a base frame.
Figure 6B:
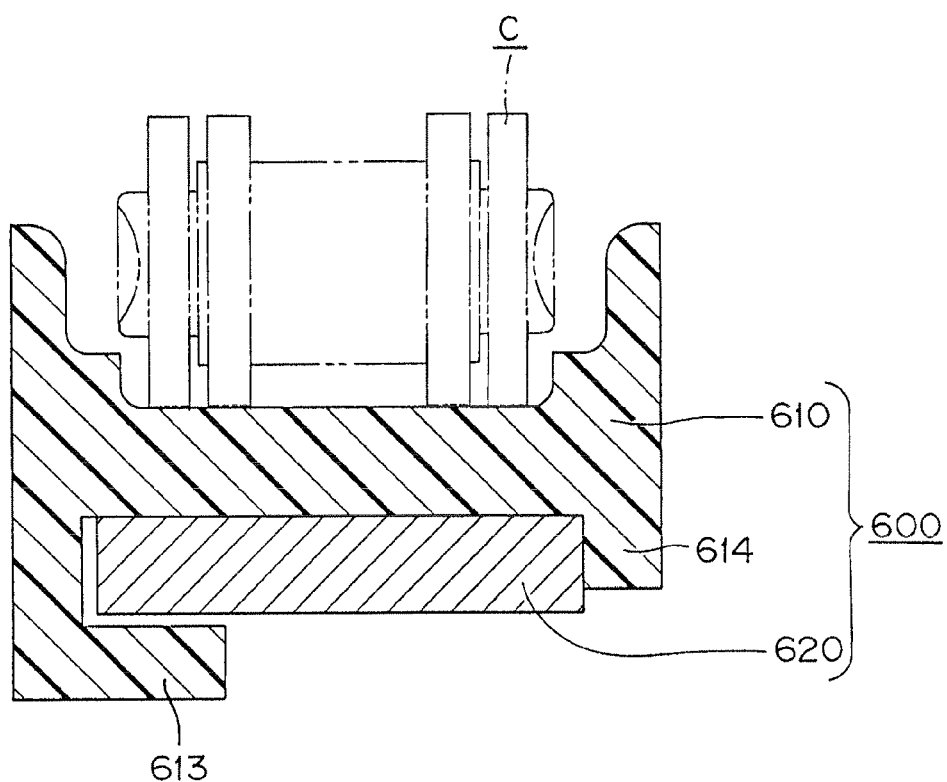
FIG. 6(b) is a cross-sectional view showing a prior art guide after its shoe is mounted on a base frame.
Figure 7A:
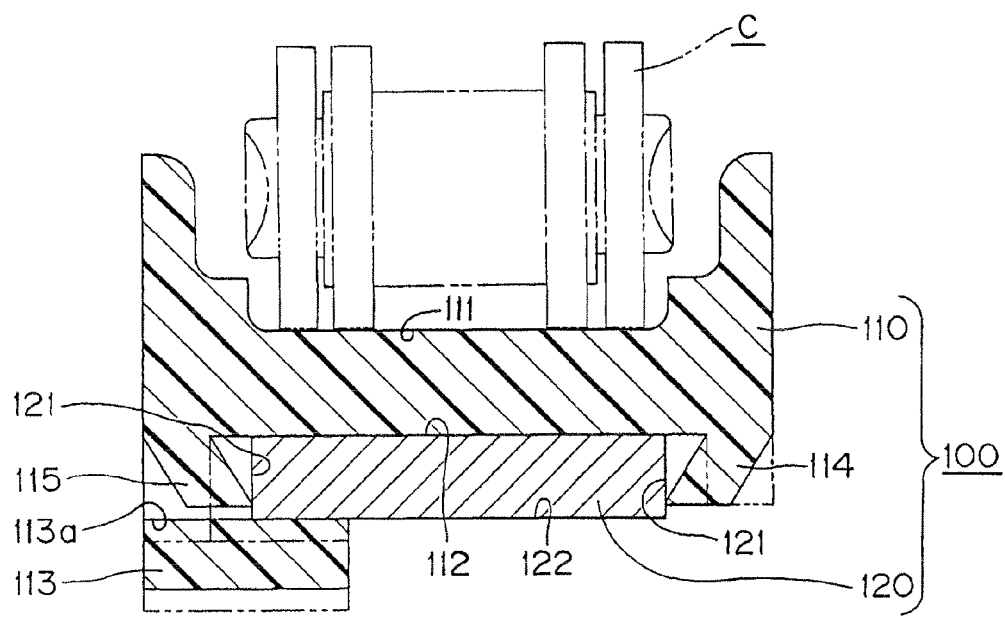
FIG. 7(a) is a cross-sectional view showing a guide according to the invention, where the guide has absorbed moisture and is thermally expanded.
Figure 7B:
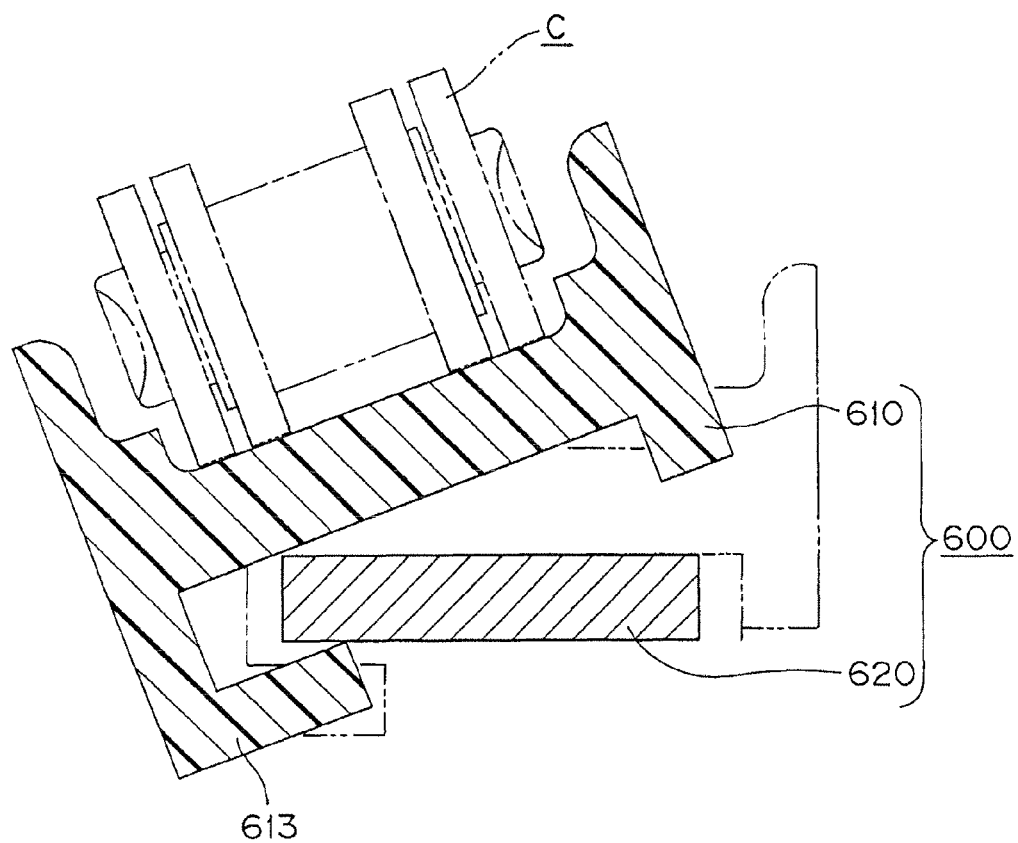
FIG. 7(b) is a cross-sectional view showing the mounting of a prior art shoe.
Figure 8:
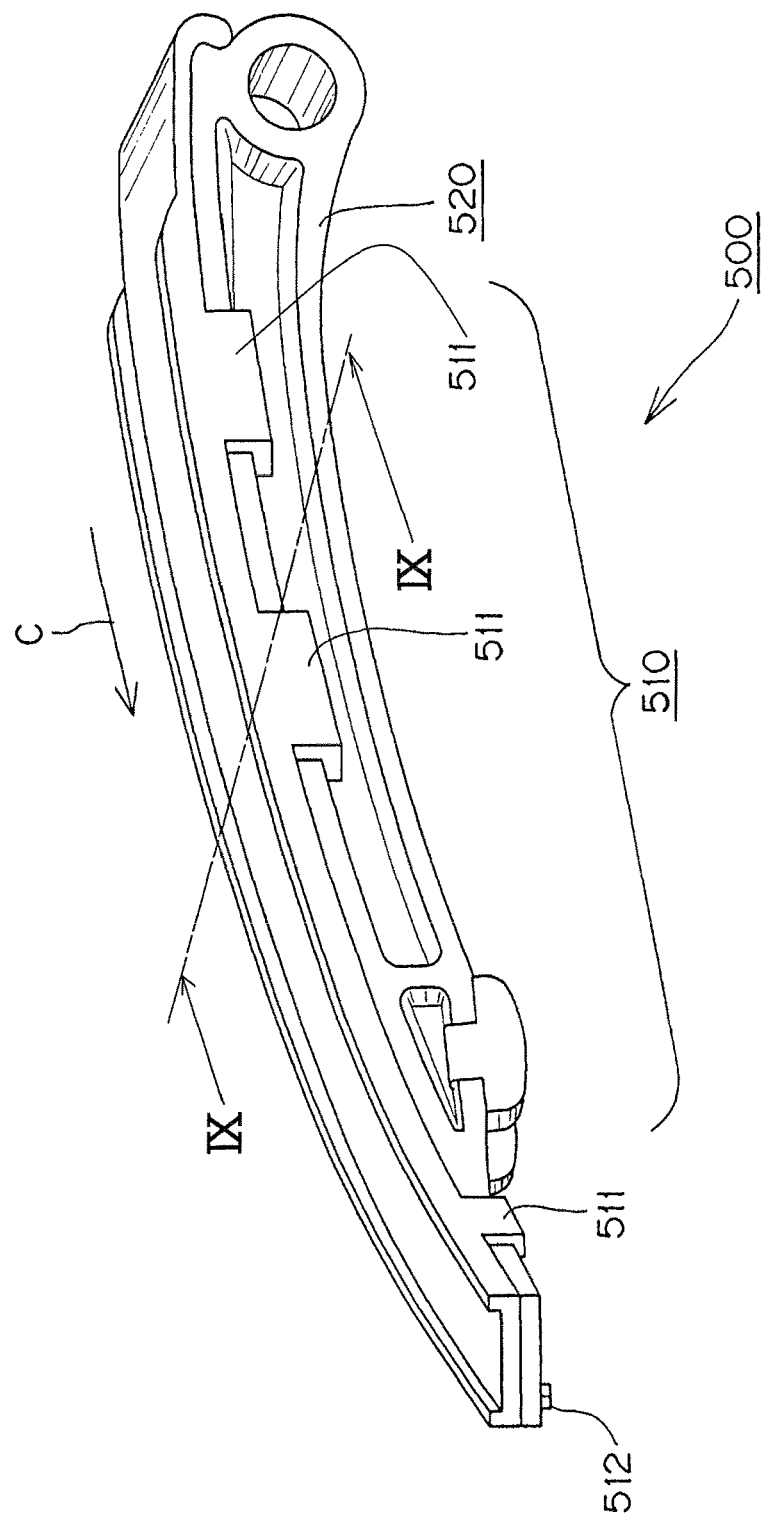
FIG. 8 is a perspective view of an assembled prior art tensioner lever.
Figure 9:
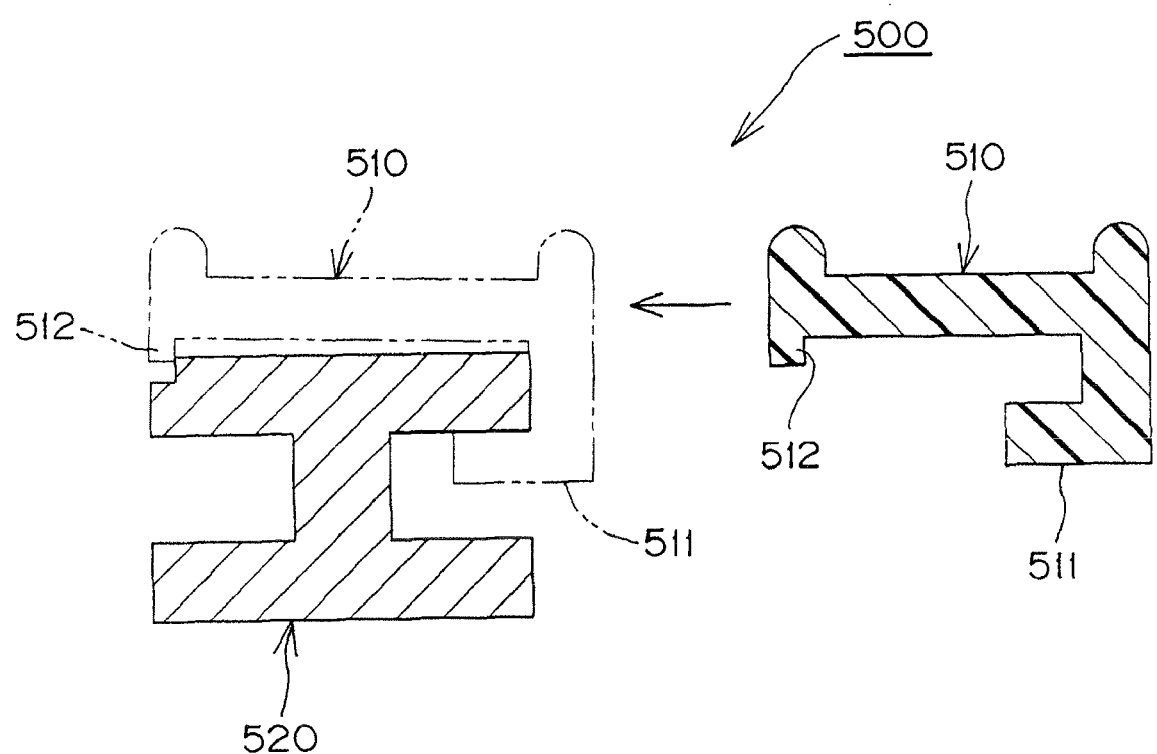
FIG. 9 is an exploded cross-sectional view of the prior art tensioner lever, taken on section plane IX-IX in FIG. 8
Figure 10:
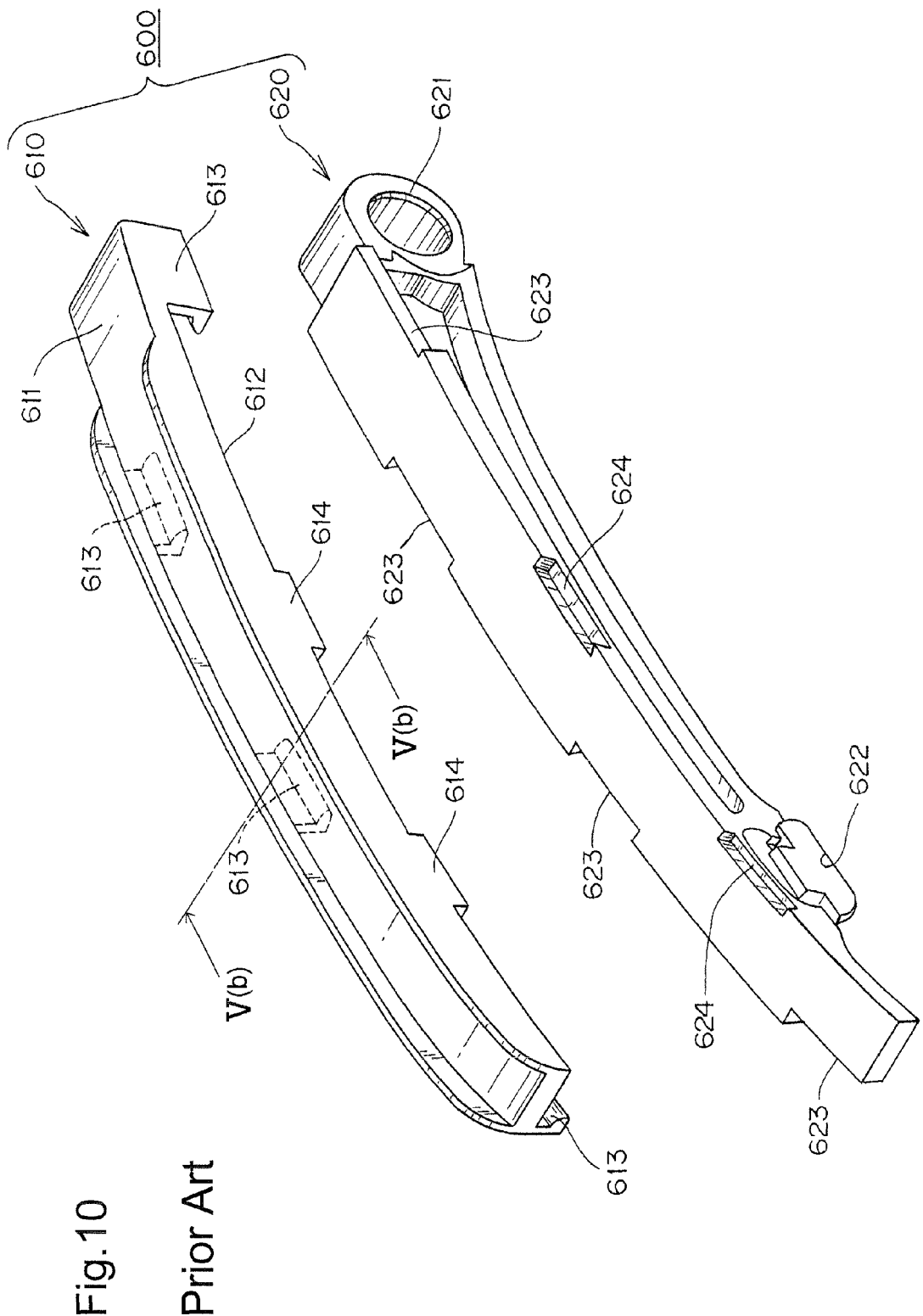
FIG. 10 is an exploded perspective view of use form view of a prior art guide.
Figure 11:
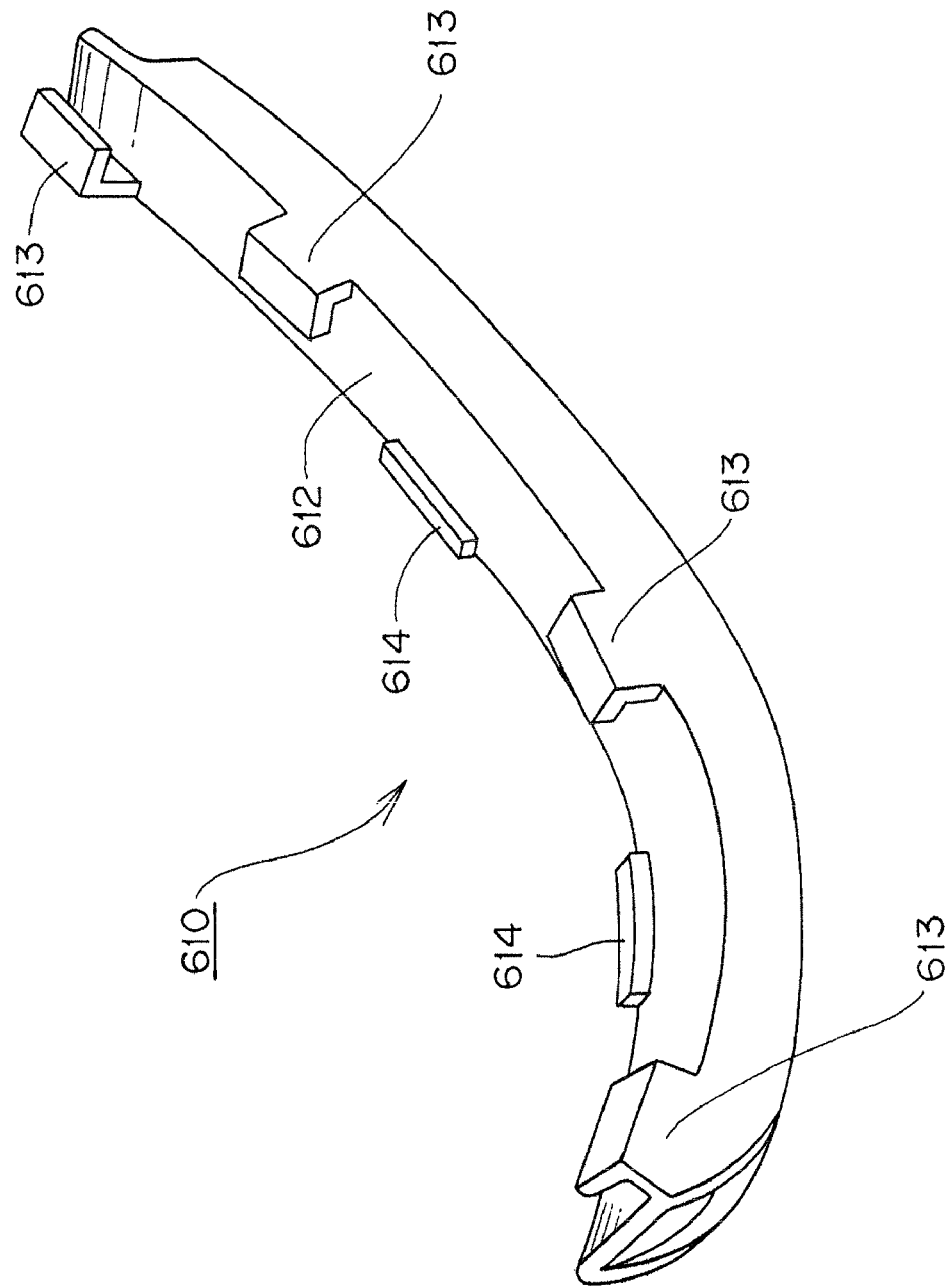
FIG. 11 is a perspective view of the shoe of the guide shown in FIG. 10.

The assembled guide 100 of the invention, as shown in FIGS. 5(a), 6(a) and 7(a) can be compared to an assembled conventional guide 600, as shown in FIGS. 5(b), 6(b) and 7(b).

First, the L-shaped engagement portion 113 and the protruding strip-shaped engagement portion 114 of the invention, as shown in FIG. 5(a), are different from the L-shaped engagement piece 613 and the strip-shaped engagement piece 614 of a conventional guide as shown in FIG. 5(b). The L-shaped engagement portion 113 of the invention includes a frame positioning tongue 115, extending obliquely, from within a cut out, toward the side surface 121 of the rectangular part of the base frame 120, pressing against the base frame resiliently. The L-shaped engagement portion 113 also includes a frame sandwiching bulging portion 113a, engageable with the bottom surface 122 of the base frame 120, so that the base frame is sandwiched the bulging portion and the back surface 112 of the shoe. Furthermore, the protruding strip-shaped engagement portion 114 includes a frame positioning limiting surface 114a, which extends obliquely toward a side surface. 121 of the base frame 120. Thus, base frame is resiliently engaged by, and embraced between, tongue 115 and engagement portion 114.

Even if clearances are provided, as shown in FIG. 6(a), between the side surfaces of the base frame 120 and the shoe, and between the base frame and the back surface 112 of the shoe, in order to facilitate assembly, the frame positioning limiting surfaces 114a of the strip-shaped engagement portions 114 and the tongues 115 of the L-shaped engagement portions 113 can embrace and resiliently engage both side surfaces of the base frame. In contrast, there is no corresponding resilient engagement between the base frame 620 and either the L-shaped engagement piece 613 or the protruding strip 614, as shown in FIG. 6(b). With the invention, dimensional tolerances of the base frame 120 and the synthetic resin shoe 110 can be relaxed, and as a result, manufacture of the guide is simplified, and the useful life of the mold used to form the shoe can be increased. Furthermore vibration noise due to backlash in the guide width direction between the shoe and the base frame can be prevented, and biased wear of the shoe and traveling lines, due to widthwise shifts in the mounted position of the shoe, are suppressed.

When the conventional shoe 610 expands due to absorption of moisture or high temperatures, it can become disengaged from its base frame 620 as shown in FIG. 7(b). On the other hand, in the guide according to the invention, even if a clearance is provided between the synthetic resin shoe 110 and the base frame 120, and the clearance is widened as a result of moisture absorption or thermal expansion, the frame positioning limiting surface 114a of the strip-shaped engagement portions 114 and the frame positioning tongue piece 115 of the L-shaped engagement portion 113, continue to press resiliently against the sides of the base frame so that the engagement of the shoe with the base frame is maintained. Furthermore, the pressing force of a tensioner plunger can act reliably against the plunger-engaging pad of a movable guide without shift in the position of abutment of the plunger against the pad.

As shown in FIG. 7(*a*), since each L-shaped engagement portion 113 includes an arc-shaped, bulged surface 113*a*, engaged with a bottom surface 122 of the base frame 120, the base frame is sandwiched between the bulged portion and the back surface of the shoe, even if a clearance is provided between the base frame and the back surface of the shoe. Consequently, assembly is facilitated, dimensional tolerances in the shoe and base frame can be relaxed, and the useful life of the mold in which the shoe is formed the can be increased. Even if a clearance between the shoe back surface of the shoe and the base frame is widened by thermal expansion, vibration noise due to backlash in a direction perpendicular to the face of the shoe can be prevented. In contrast, as seen in FIG. 7(*b*), if a clearance exists between the shoe and the base frame, or develops as a result of moisture absorption or thermal expansion, vibration noise can occur.

In summary, the invention affords advantages over the conventional guide in that the resilient tongue 115 on the L-shaped engagement portions 113 and the frame positioning limiting surface 114*a* on the strip-shaped engagement portions 114, facilitate assembly, allow relaxation of dimensional tolerances, and prolong the useful life of the mold used to form the shoe. Clearance between the shoe and the base frame is removed during use of the guide so that biased wear of the shoe due to shifts in its mounting position, the formation of traveling lines, can be suppressed, and vibration noise due to backlash can also be prevented.

We claim:

1. A guide for a transmission device comprising:
   an elongated shoe having a front surface, facing in a first direction, for sliding contact with an endless, flexible, transmission medium traveling along the direction of elongation of the shoe, said shoe having a back surface facing in a second direction opposite to said first direction, first and second opposite ends spaced from each other along the direction of elongation of the shoe, and opposite side edges extending in the direction of elongation of the shoe;
   an elongated base frame mountable on a mounting surface, said base frame extending along the back surface of the shoe and supporting said shoe, and having first and second elongated sides;
   a plurality of L-shaped engagement portions and strip shaped engagement portion, said engagement portions being integrally molded as a unit with said shoe and protruding from the back surface of the shoe along said side edges in an alternating arrangement in which, proceeding from one end of the shoe to the other, each successive engagement portion is farther from said one end, and protrudes from a different side edge than, an immediately preceding engagement portion, whereby said engagement portions alternately embrace the first and second elongated sides of said base frame;
   wherein each said L-shaped engagement portion comprising a first leg extending in said second direction past a side of the base frame, a second leg extending laterally in a direction such that a part of the base frame is located between the second leg and the back surface of the shoe, and a positioning tongue extending obliquely, from within a cut-out in said first leg, toward, and resiliently pressing against, an adjacent side of the base frame; and
   wherein each said strip-shaped engagement portion includes a frame positioning limiting surface, extending obliquely from the back surface of the shoe toward, and resiliently pressing against, an adjacent side surface of the base frame.

2. A guide for a transmission device according to claim 1, in which a bulged portion is formed on the second leg of each said L-shaped engagement portion, each said bulged portion protruding toward the back surface of the shoe, and engaging the base frame, whereby the base frame is sandwiched between the bulged portion and the back surface of the shoe.

* * * * *